United States Patent
Abbey et al.

(10) Patent No.: US 7,103,763 B2
(45) Date of Patent: Sep. 5, 2006

(54) STORAGE AND ACCESS OF CONFIGURATION DATA IN NONVOLATILE MEMORY OF A LOGICALLY-PARTITIONED COMPUTER

(75) Inventors: Christopher Patrick Abbey, Rochester, MN (US); Jonathan Ross Van Niewaal, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 10/422,213

(22) Filed: Apr. 24, 2003

(65) Prior Publication Data

US 2004/0215948 A1 Oct. 28, 2004

(51) Int. Cl.
*G06F 15/177* (2006.01)
*G06F 9/445* (2006.01)
*G06F 9/00* (2006.01)

(52) U.S. Cl. .............................. 713/1; 713/2; 713/100

(58) Field of Classification Search ..................... None
See application file for complete search history.

(56) References Cited

U.S. PATENT DOCUMENTS 6,279,046 B1 * 8/2001 Armstrong et al. ............ 710/5
6,467,007 B1 * 10/2002 Armstrong et al. ......... 710/260
2005/0025140 A1 * 2/2005 Deforche et al. ........... 370/363

* cited by examiner

*Primary Examiner*—Lynne H. Browne
*Assistant Examiner*—Stefan Stoynov
(74) *Attorney, Agent, or Firm*—Wood, Herron & Evans, LL

(57) ABSTRACT

An apparatus, program product and method utilize a nonvolatile solid state memory organized so as to store variable amounts of configuration data for a logically-partitioned computer in an efficient, compact and cost-effective manner. A nonvolatile solid state memory is partitioned into fixed size blocks that are linked together into chains for the purpose of storing variable amounts of configuration data for a plurality of logical entities, e.g., logical partitions, hardware devices, networks, and other resources. A chain of fixed size blocks is used to maintain configuration data for a given type of logical entity, with each block in a chain storing configuration data for a particular logical entity of the associated entity type. The fixed size blocks include full blocks and shared blocks, with full blocks storing data for a single logical entity, and shared blocks storing data for multiple logical entities of a common entity type.

27 Claims, 4 Drawing Sheets

STORAGE AND ACCESS OF CONFIGURATION DATA IN NONVOLATILE MEMORY OF A LOGICALLY-PARTITIONED COMPUTER

FIELD OF THE INVENTION

The invention relates to computers and computer software, and in particular, to the storage and access of configuration data in a computer such as a logically-partitioned computer.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a software standpoint, multithreaded operating systems and kernels have been developed, which permit computer programs to concurrently execute in multiple "threads" so that multiple tasks can essentially be performed at the same time. Threads generally represent independent paths of execution for a program. For example, for an e-commerce computer application, different threads might be assigned to different customers so that each customer's specific e-commerce transaction is handled in a separate thread.

From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors.

One logical extension of parallel processing is the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

With logical partitioning, a shared program, often referred to as a "hypervisor" or partition manager, manages the logical partitions and facilitates the allocation of resources to different logical partitions. For example, a partition manager may allocate resources such as processors, workstation adapters, storage devices, memory space, network adapters, etc. to various partitions to support the relatively independent operation of each logical partition in much the same manner as a separate physical computer.

In connection with managing logical partitions, configuration data typically must be maintained for each logical partition, as well as for any resources that are allocated to each logical partition. This configuration data is often required both during runtime, and during initialization of the computer upon startup. As a result, the configuration data typically must be persistently maintained in some form of persistent storage so that the information is protected from data loss in the event of a system failure.

Conventionally, configuration data for a logically-partitioned computer has been maintained in mass storage, e.g., on a disk drive or other magnetic media coupled to the computer. Mass storage typically has the benefit of relatively low cost per byte, which from the perspective of configuration data storage, effectively places no limitations on the amount of configuration data that may be maintained in mass storage. As a result, the amount of storage space occupied by the configuration data for a logically-partitioned computer has not been a significant concern for system designers.

In some circumstances, however, it may be desirable to store configuration data in another form of persistent memory. For example, a nonvolatile solid state memory such as flash memory has been found to be at least an order of magnitude faster than mass storage. Were such a memory used to store configuration data, it is believed that substantial performance gains could be realized over the use of mass storage in terms of storing and retrieving configuration data. Furthermore, access to flash memory may be handled at a much lower level in a computer than a mass storage device, as the latter of which typically requires the use of relatively higher levels of software to manage the transfer of data to and from the device. Particularly when configuration data is required at the earliest stages of the startup of a computer, accessing mass storage to retrieve such data may be significantly more complex and time consuming.

Despite the significant performance advantages of flash memory and other forms of nonvolatile solid state memories, to date the comparatively higher costs of such memory have made such memory cost prohibitive for many applications. The costs of such memory continues to fall, however, and as a result, nonvolatile solid state memories have become more economically feasible for some applications, including for storing configuration data. Given the economic constraints placed on system designers, however, a significant need has arisen for optimizing the manner in which configuration data is stored in a nonvolatile solid state memory so that the amount of nonvolatile solid state memory used in a particular system design can be minimized. Moreover, for configuration data utilized in connection with logical partitioning, the amount of configuration data required for a logical partition can vary based upon partition type, as well as based upon the addition or removal of resources to and from the logical partition. As a result, it can be difficult to predict how much configuration data will be required for a given customer installation.

SUMMARY OF THE INVENTION

The invention addresses these and other problems associated with the prior art by providing an apparatus, program product and method that utilize a nonvolatile solid state memory organized so as to store variable amounts of configuration data for a logically-partitioned computer in an efficient, compact and cost-effective manner. In particular, a nonvolatile solid state memory is partitioned into fixed size blocks that are linked together into chains for the purpose of storing variable amounts of configuration data for a plurality of logical entities, e.g., logical partitions, hardware devices, networks, etc. A chain of fixed size blocks is used to maintain configuration data for a given type of logical entity, with each block in a chain storing configuration data for a particular logical entity of the associated entity type.

The fixed size blocks include full blocks and shared blocks, with full blocks storing data for a single logical entity, and shared blocks storing data for multiple logical entities of a common entity type. In addition, one or more header blocks may be used to store links to each chain of blocks, e.g., to provide a header to the blocks associated with each defined entity type. With such an organization, it is believed that configuration data may be stored more compactly within a nonvolatile solid state memory, thereby increasing the amount of configuration data that can be stored in the memory and/or permitting a smaller and less expensive memory device to be utilized to store a given amount of configuration data.

Therefore, consistent with one aspect of the invention, a nonvolatile solid state memory may be configured to store configuration data for a plurality of logical entities in a logically-partitioned computer, with the plurality of logical entities including first and second logical entities having the same entity type among a plurality of entity types. The memory is organized into a plurality of fixed size blocks, with the plurality of fixed size blocks including at least one full block and at least one shared block linked to one another in a chain. The full block includes configuration data for the first logical entity, and the shared block includes configuration data for each of the first and second logical entities. Program code may be configured to access the configuration data for the first logical entity by accessing the nonvolatile solid state memory to retrieve configuration data stored in each of the full and shared blocks in the chain.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter provide for storage of configuration data utilized in a logically-partitioned computer, typically the configuration data utilized by a partition manager to manage the logical partitions and allocated resources in a logically-partitioned computer, within a nonvolatile solid state memory. Moreover, the configuration data stored in such a memory is organized in a compact and efficient manner, e.g., to maximize the amount of configuration data that may be stored in a given size of nonvolatile solid state memory, or to permit a smaller and less expensive memory to be used to meet the data requirements for a particular logically-partitioned computer implementation.

Figure 1:
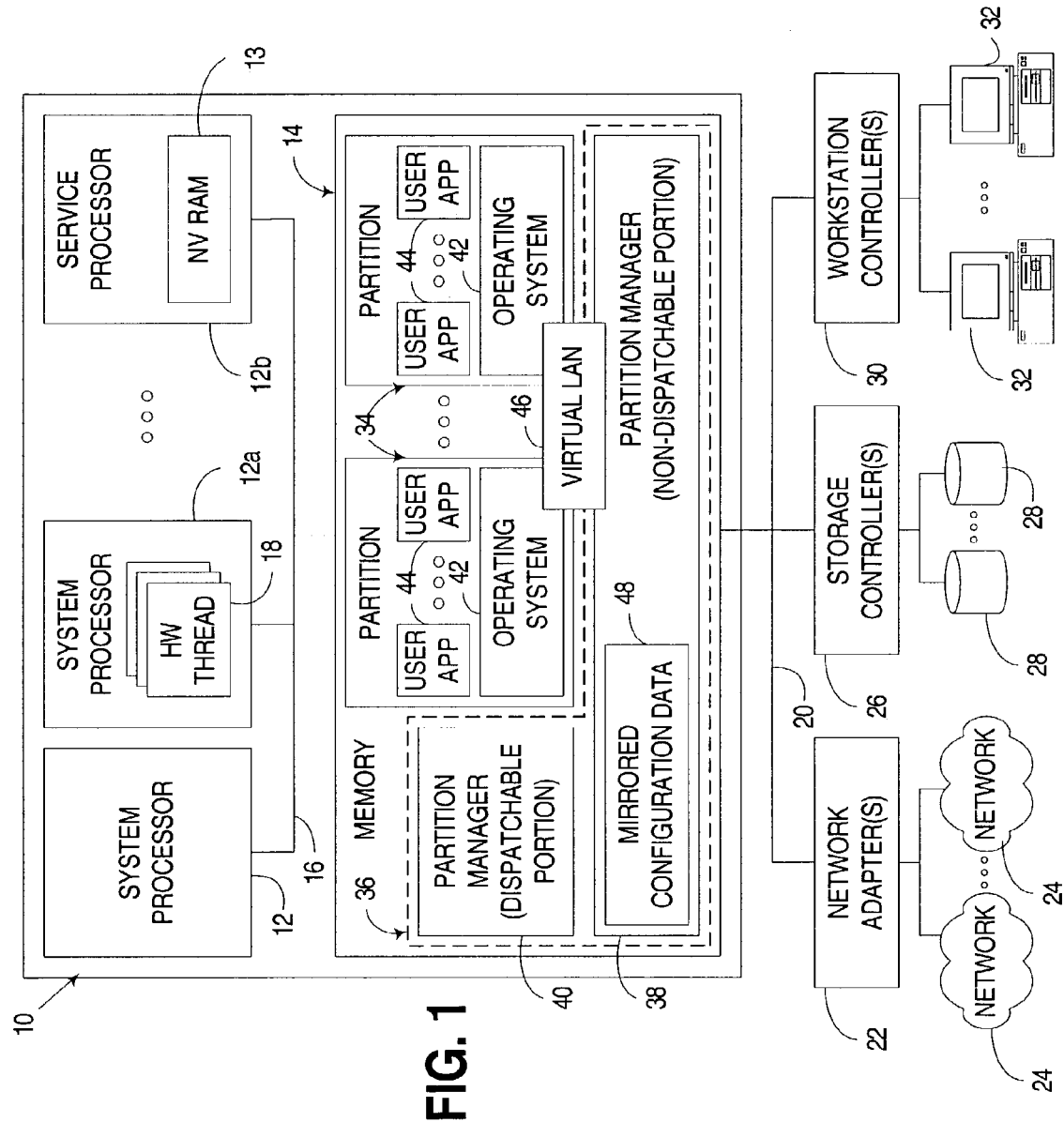
FIG. 1 is a block diagram of the principal hardware components in a logically-partitioned computer consistent with the invention.

Turning now to the Drawings, wherein like numbers denote like parts throughout the several views, FIG. 1 illustrates the principal hardware components in a logically-partitioned computer 10 consistent with the invention. Computer 10 generically represents, for example, any of a number of multi-user computers such as a network server, a midrange computer, a mainframe computer, etc., e.g., an IBM eServer computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like).

Computer 10 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18. For the most part, each hardware thread 18 in a multithreaded processor 12a is treated like an independent processor by the software resident in the computer.

In addition, as is also illustrated in FIG. 1, one or more of processors 12 (e.g., processor 12b) may be implemented as a service processor, which is used to run specialized firmware code to manage system initial program loads (IPL's), and to monitor, diagnose and configure system hardware. Moreover, service processor 12b may include an on-board nonvolatile solid state memory 13 (e.g., a flash memory) within which configuration data for the computer is maintained. It will be appreciated, however, that forms of nonvolatile solid state memory other than flash memory may be used, and furthermore, that nonvolatile solid state memory may reside elsewhere in computer 10, e.g., in another processor 12, in another hardware device, in a standalone hardware device (e.g., a memory card coupled to bus 16), etc. Moreover, configuration data may be distributed among multiple memories in some embodiments consistent with the invention.

Generally, computer 10 will include one service processor and multiple system processors, which are used to execute the operating systems and applications resident in the computer, although the invention is not limited to this particular implementation. In some implementations, a service processor may be coupled to the various other hardware components in the computer in manners other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via a bus 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

FIG. 1 also illustrates in greater detail the primary software components and resources utilized in implementing a logically partitioned computing environment on computer 10, including a plurality of logical partitions 34 managed by a partition manager or hypervisor 36. Any number of logical partitions may be supported as is well known in the art, and the number of logical partitions resident at any time in a computer may change dynamically as partitions are added or removed from the computer.

In the illustrated IBM eServer-based implementation, partition manager 36 is comprised of two layers of program code. The first, referred to herein as a non-dispatchable portion 38, is implemented within the firmware, or licensed internal code (LIC), of computer 10, which is utilized to provide a low level interface to various hardware components while isolating higher layers, e.g., the operating systems, from the details of the hardware access. The firmware may also communicate with a service processor such as service processor 12b. The non-dispatchable portion 38, which is also referred to herein as "PLIC", provides many of the low level partition management functions for computer 10, e.g., page table management, etc. The non-dispatchable portion 38 also has no concept of tasks, and is accessible principally via function calls from higher layers of software.

The second layer of program code in partition manager 36 is referred to herein as a dispatchable portion 40, or alternatively "PHYP". In contrast to non-dispatchable portion 38, which has no concept of tasks, is run with relocation off, and is accessible via function calls from higher layers of software, the dispatchable portion 40 has the concept of tasks (like any operating system), and is run with relocation on. The dispatchable portion typically executes in much the same manner as a partition, except that it is hidden from the user. The dispatchable portion generally manages higher level partition management operations such as creating and deleting partitions, concurrent I/O maintenance, allocating processors, memory and other hardware resources to various partitions 34, etc.

In the illustrated embodiment, at least a portion of the program code for the partition manager is resident in flash memory. Thus configured, logical partitioning can be initialized on the computer without requiring access to a mass storage device.

Each logical partition 34 is typically statically and/or dynamically allocated a portion of the available resources in computer 10. For example, each logical partition may be allocated one or more processors 12 and/or one or more hardware threads 18, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, display devices, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time. In addition, some resources may be "virtual" in nature, e.g., virtual network adapters used in a virtual local area network.

Each logical partition 34 utilizes an operating system 42 that controls the primary operations of the logical partition in the same manner as the operating system of a non-partitioned computer. For example, each operating system 42 may be implemented using the OS/400 operating system available from International Business Machines Corporation, or alternatively, another operating system such as AIX or Linux.

Each logical partition 34 executes in a separate, or independent, memory space, and thus each logical partition acts much the same as an independent, non-partitioned computer from the perspective of each user application (user app) 44 that executes in each such logical partition. As such, user applications typically do not require any special configuration for use in a partitioned environment.

Given the nature of logical partitions 34 as separate virtual computers, it may be desirable to support inter-partition communication to permit the logical partitions to communicate with one another as if the logical partitions were on separate physical machines. As such, in some implementations it may be desirable to support a virtual local area network (LAN) 46 in non-dispatchable portion 38 to permit logical partitions 34 to communicate with one another via a networking protocol such as the Ethernet protocol. Other manners of supporting communication between partitions may also be supported consistent with the invention.

It will be appreciated that other logically-partitioned environments may be utilized consistent with the invention. For example, rather than utilizing a dispatchable portion 40 that is separate from any partition 34, the functionality of the dispatchable portion may be incorporated into one or more logical partitions in the alternative.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

As noted above, embodiments consistent with the invention utilize a nonvolatile memory to store configuration data for a plurality of logical entities in a logically-partitioned computer. As shown in FIG. 1, for example, a nonvolatile memory 13 resident in a service processor 12b may be used to persistently store configuration data utilized by a partition manager to manage partitions and the system resources utilized thereby. In some embodiments, however, it may be desirable to maintain a mirrored copy of the configuration data in volatile memory, e.g., the main memory of the system, to permit faster access by the partition manager. FIG. 1 therefore illustrates mirrored configuration data 48 being resident in the memory space accessible to partition manager 36. In other embodiments, however, no mirrored copy of the configuration data may be maintained.

In embodiments consistent with the invention, it is desirable to partition the nonvolatile solid state memory into a plurality of fixed size blocks. Moreover, it is desirable to provide each block with a header to identify the contents of the block. Several primary blocks types may then be defined.

Figure 2:
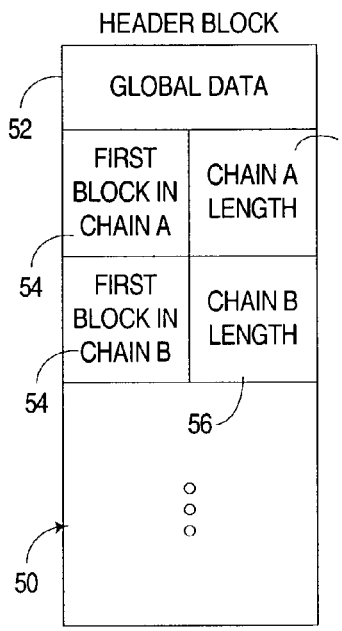
FIG. 2 is a block diagram of an exemplary data structure for a full block used to store configuration data in the nonvolatile solid state memory of FIG. 1.

One such type, for example, is a header block, which is used to provide global configuration data, as well as to provide pointers or links to chains of blocks that are used to store configuration data for various types of logical entities managed by a partition manager. For example, as shown in FIG. 2, a header block may include a section of global data 52, followed by multiple pairs of block links 54 and length indicators 56 associated with different types of logical entities.

In the illustrated embodiment, a single header block is used. Moreover, the header block is typically larger than a single fixed size block. For example, a header block may occupy multiple fixed size blocks.

Global data stored at 52 may include, for example, information such as number of partitions, number of processors, amount of installed memory, size of data, checksum, version, and practically any other configuration information needed by a partition manager, but not associated with any particular partition or other logical entity.

For each link/length indicator pair, the link 54 points to a first block in a chain of blocks stored in the nonvolatile solid state memory, and the length indicator 56 stores the number of blocks that exist in a given chain. It will be appreciated that a length indicator may be omitted in some embodiments, and moreover, that different types of links or pointers may be stored in each link 54. For example, a link may reference the particular address of a first memory element (e.g., byte or word) in a given block. In the alternative, a link may reference a given block, with a known address mapping used to derive the starting address for the block. If a block size that is a power of 2 is used, and if blocks are arranged on even address boundaries, a link may simply reference a subset of the bits in the starting address of a block.

A link/length indicator pair is typically provided for each type of logical entity represented in the configuration data. For example, entity types may be defined for logical partitions, networks, hardware devices, input/output adapters, and practically any other type of hardware or software resource utilized by a logically-partitioned computer. Furthermore, where virtual devices, adapter, networks, etc. are used, entity types may also be defined for such virtual resources. In addition, it may also be desirable to utilize an entity type for empty or unused blocks, so that empty or unused blocks may be chained together, and so that blocks may be dynamically assigned to different entity type chains by removing the blocks from the chain of empty or unused blocks and reassigning the blocks to the appropriate entity type chains. Other manners of maintaining a mapping of empty or unused blocks may be used in the alternative.

It will be appreciated that other link formats, e.g., indices to pointer tables or other data structures, may be used in the alternative. Moreover, other data may be stored in a header block consistent with the invention, or the data described above may be organized in different formats and data structures. For example, rather than being a hard coded format block, a header block may include header information that defines the format of the data in the block.

Figure 3:
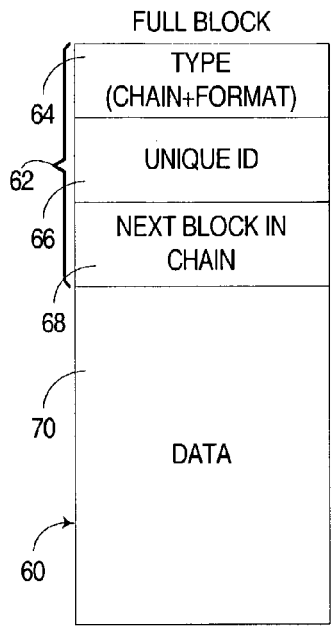
FIG. 3 is a block diagram of an exemplary data structure for a shared block used to store configuration data in the nonvolatile solid state memory of FIG. 1.

Another type of block supported in the nonvolatile memory is a full block type, which is used to store configuration data for a single logical entity of a given type. In this type of block, it is typically desirable for the header to include a unique identifier for the block. For example, as shown in FIG. 3, a full block 60 may include a header 62 that includes a type field 64, unique identifier field 66 and next block link field 68. Data 70, representing the configuration data payload for the block, and may store practically any type of configuration information as desired and appropriate for the logical entity with which the block is associated.

Type field 64 includes at least data used to identify both the chain to which the block belongs and the format of the data 70 stored in the block. As such, type field 64 is used in part to determine how to interpret the data stored in the block, and permits block 60 to be used to store practically any type of configuration data for a wide variety of logical entities. The actual layout of the data may be encoded in the type field, or in the alternative, the type field may include a format identifier that maps to a format defined in another data structure in the computer. Also in the alternative, the data in a full block may have a hard coded format, rather than having the format encoded in field 64.

Unique identifier field 66 may store practically any type of identifier that uniquely identifies a block, such that the block can be distinguished from other blocks in the same chain. Next block link field 68 stores a pointer or link to the next block in the chain to which the full block belongs. As with a header block, different types of links may be defined in field 68.

Figure 4:
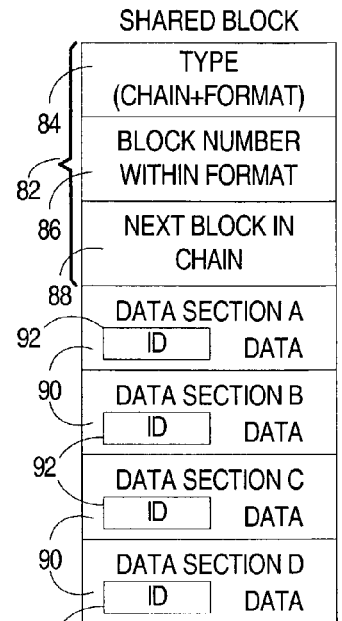
FIG. 4 is a block diagram of an exemplary data structure for a header block used to store configuration data in the nonvolatile solid state memory of FIG. 1.

Yet another type of block is a shared block, which includes a plurality of fixed size sub-blocks that store data of a similar type, but that typically store configuration data for multiple configurations or logical entities. In this type of block, it is typically desirable for each sub-block to include a unique identifier, rather than having a unique identifier for the entire shared block. For example, as shown in FIG. 4, a shared block 80 may include a header 82 that includes a type field 84, block number within format field 86 and next block link field 88. The configuration data or payload for the block includes a plurality of sub-blocks 90, with each having a unique identifier 92 encoded therein.

Type field 84 is similar in use and configuration to field 64 of a full block, and includes data used to identify both the chain to which the block belongs and the format of the configuration data stored in the block. In this regard, the format data may specify the sizes, formats, and numbers of sub-blocks defined in the shared block (FIG. 4, for example, illustrates a shared block with four sub-blocks of equal size and format being defined). In the alternative, the data in a shared block may have a hard coded format, rather than having the format encoded in field 84.

Block number within format field 86 defines an identifier that is unique across that type within the chain. The field may be used, for example, for mapping changes to a specific block in the type, which is useful for updating information.

Next block link field 88 stores a pointer or link to the next block in the chain to which the shared block belongs. As with a header block, different types of links may be defined in field 88.

In the illustrated embodiment, headers 62, 82 for full and shared blocks 60, 80 are effectively equivalent, with the primary difference being the different interpretation of fields 66, 86 based upon block type.

It will be appreciated that other types of information may be stored in full and shared blocks consistent with the invention. For example, other types of information may be encoded in the headers thereof. Furthermore other layouts and organizations may be used for each type of block. Additional block types may also be defined, e.g., multiple full or shared block types to address different hard coded layouts and formats. In addition, it may be desirable to provide the capability to string multiple contiguous fixed size blocks together to form a larger block, e.g., by encoding identifiers in the headers of each block that indicates that the block is tied to its immediately preceding block. Other modifications and additions will be apparent to one of ordinary skill in the art having the benefit of the instant disclosure.

Figure 5:
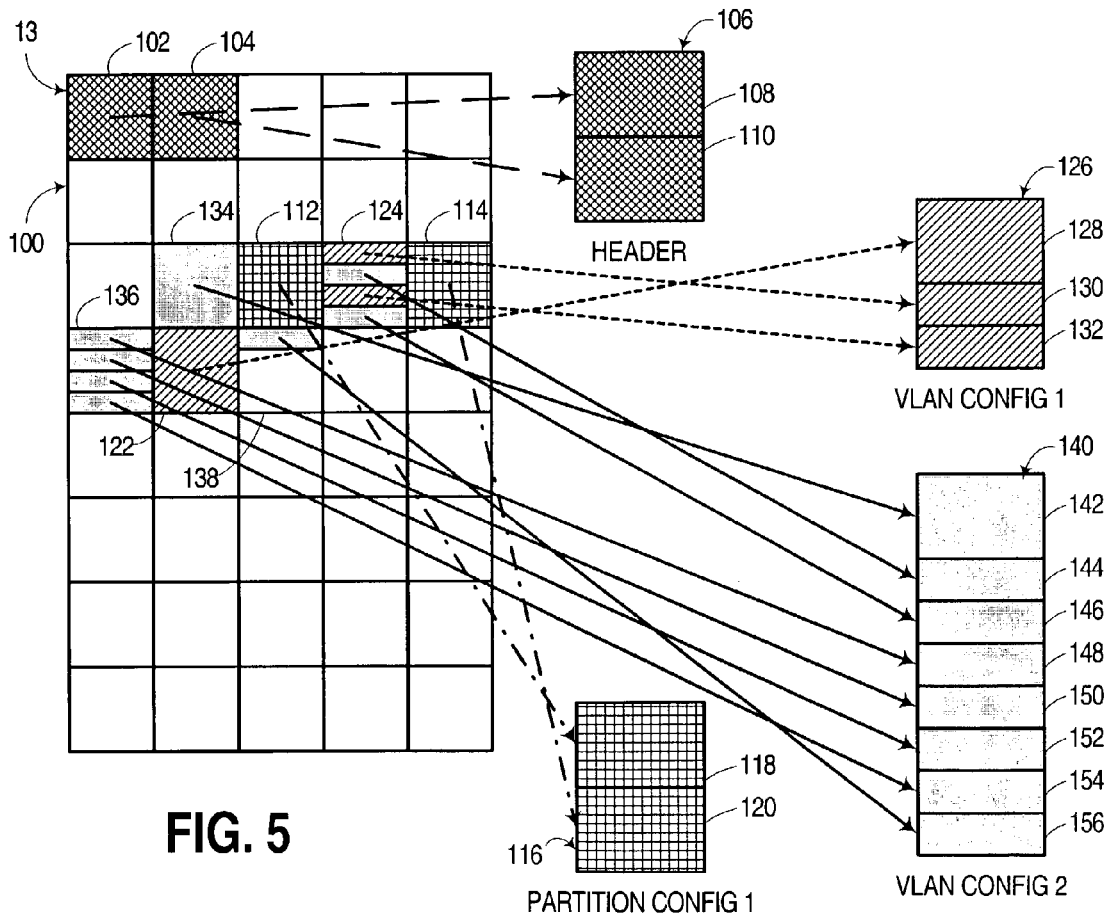
FIG. 5 is a block diagram of an exemplary layout of configuration data in the nonvolatile solid state memory referenced in FIG. 1.

FIG. 5 next illustrates an exemplary layout of configuration data in nonvolatile solid state memory 13 as might be found during runtime of logically-partitioned computer 10. In particular, an array 100 of fixed size blocks, e.g., 100 blocks of 64 bytes each, may initially be used. Forty blocks are shown in FIG. 5 merely for ease of illustration.

As noted above, the configuration data in nonvolatile solid state memory 13 may be mapped into faster volatile memory for ease and speed of access during operation of a partition manager. As such, FIG. 5 also illustrates via arrows the mapping of the fixed size blocks in nonvolatile memory 13 to corresponding blocks in volatile memory. The blocks in the volatile memory may be mapped into an organization that is essentially the same as that for nonvolatile memory 13, or in the alternative, the organization may differ. For example, configuration data in the volatile memory may be grouped to place all configuration data for each particular logical entity in contiguous memory.

FIG. 5 illustrates a header block that is comprised of a pair of fixed size blocks 102, 104, and that is mapped into volatile memory as a volatile interface object 106 including non-persistent blocks 108 and 110. The header block typically includes chain/length pairs for the empty blocks, as well as for a "Logical Partition" entity type and a "Virtual Local Area Network" (VLAN) entity type.

The chain of blocks for the "Logical Partition" entity type points to a chain of blocks associated with a first logical partition installed in the computer (Partition Config 1), including a pair of full size blocks 112, 114 that are mapped to a volatile interface object 116 including non-persistent blocks 118 and 120. Blocks 112, 114 may include headers that respectively identify the blocks as being "Partition 1, Block 1" and "Partition 1, Block 2", for example.

The chain of blocks for the "Virtual Local Area Network" entity type points to a chain incorporating two types of blocks, one associated with a first VLAN installed in the computer (VLAN Config 1), and the other associated with a second VLAN installed on the computer (VLAN Config 2).

VLAN Config 1 is illustrated as including one full size block 122 and two sub-blocks from a shared block 124, which are mapped to a volatile interface object 126 including non-persistent full size block 128 and non-persistent sub-blocks 130 and 132. Full block 122 may include a header that identifies the block as being "VLAN Config 1, VLAN Block" to represent that the block is formatted with primary VLAN configuration data. Shared block 124 may have a header identifying the block as being a "VLAN Overflow Block" to represent that the block is formatted with overflow VLAN configuration data, with each sub-block including a unique identifier that identifies the sub-block as belonging to VLAN Config 1.

Likewise, VLAN Config 2 is illustrated as including one full block 134 and seven sub-blocks from shared blocks 124, 136 and 138, which are mapped to a volatile interface object 140 including non-persistent full size block 142 and non-persistent sub-blocks 144, 146, 148, 150, 152, 154 and 156. Full block 134 may include a header that identifies the block as being "VLAN Config 2, VLAN Block" to represent that the block is formatted with primary VLAN configuration data. Shared blocks 124, 136 and 138 may have headers identifying the blocks as each being a "VLAN Overflow Block" to represent that the respective block is formatted with overflow VLAN configuration data, with each sub-block therein including a unique identifier that identifies the sub-block as belonging to VLAN Config 2.

It will be appreciated that the arrangement of blocks shown in FIG. 5 is merely exemplary in nature, as a wide variety of alternate arrangements could be used to store the aforementioned configuration data consistent with the invention.

Figure 6:
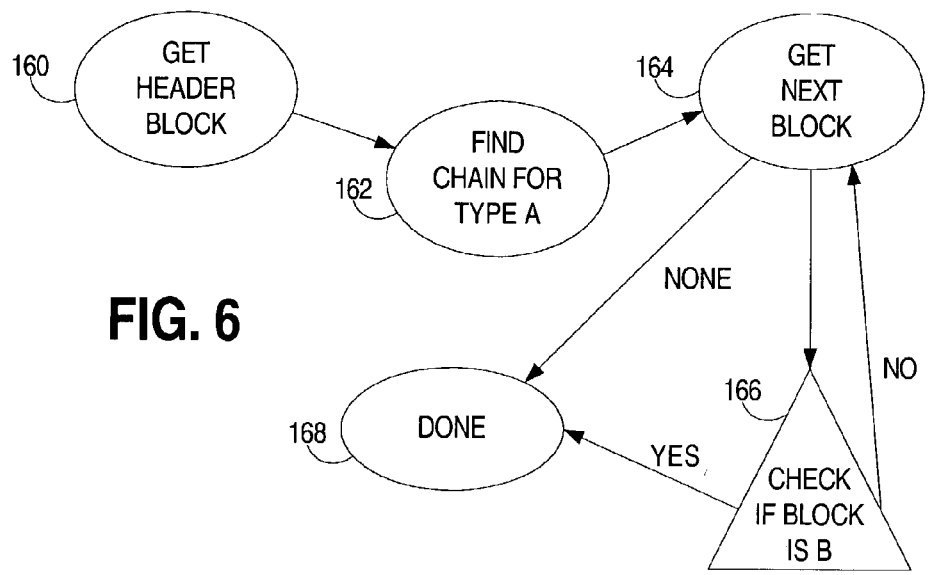
FIG. 6 is a flowchart illustrating exemplary steps utilized in accessing data in a full block from the nonvolatile solid state memory of FIG. 1.
Figure 7:
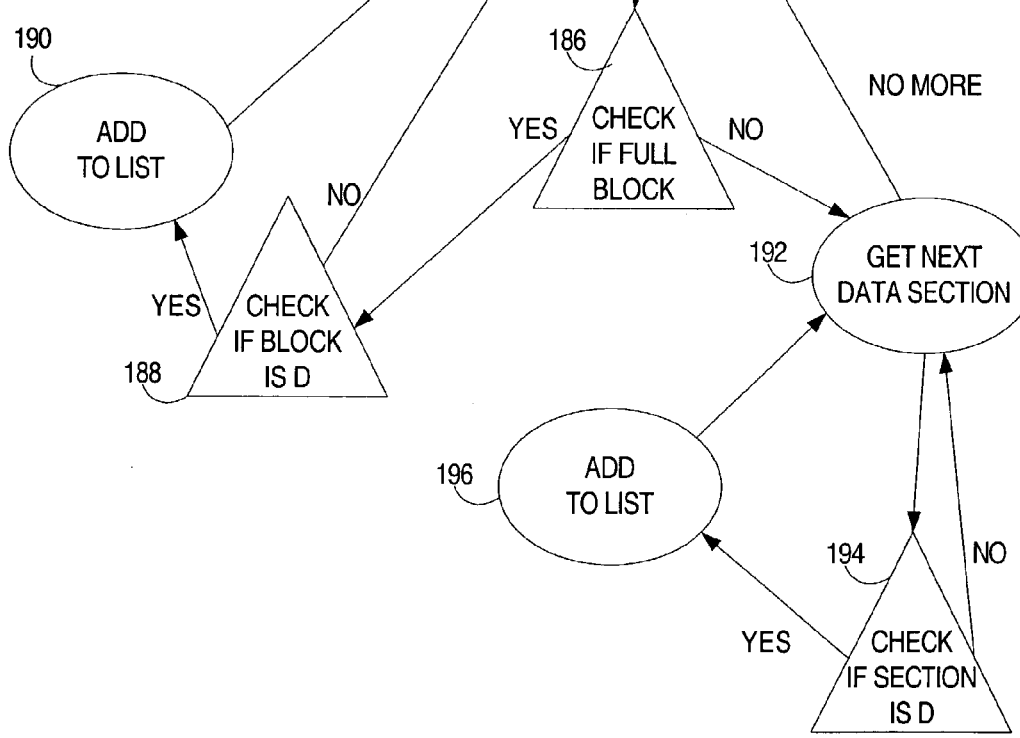
FIG. 7 is a flowchart illustrating exemplary steps utilized in accessing a group of data in one or more blocks from the nonvolatile solid state memory of FIG. 1.

FIGS. 6 and 7 illustrate the basic program flows associated with locating relevant configuration data in a nonvolatile memory organized in a manner consistent with the invention. For example, FIG. 6 illustrates exemplary steps utilized in accessing data in a specific full block from nonvolatile solid state memory 13.

In this example, it is assumed that it is desired to find configuration data for a logical entity "B" having an entity type of "A". As such, access to the desired block is initiated at step 160 by accessing the header block for the nonvolatile solid state memory. Control then passes to step 162 to find the link to the chain for the blocks related to entity type "A" in the header block. Control then passes to step 164 to step down through the chain, by first following the link to the chain in the header block to the first block in the chain. Control then passes to step 166 to determine if the block is for the logical entity "B". If so, control passes to step 168 to terminate the search, as the desired data has been located. Otherwise, control passes back to step 164 to proceed down the chain to the next block, and then back to step 166 to determine if the next block is for the desired logical entity. Control therefore iterates between steps 164 and 166 until the desired information is located. In some embodiments, step 164 may also check to see if any more unprocessed blocks remain in the chain, and if none exist, return an error.

FIG. 7 illustrates exemplary steps utilized in accessing data from a plurality of blocks from nonvolatile solid state memory 13. In this example, it is assumed that it is desired to find configuration data for a logical entity "D" having an entity type of "C", and to build a list of all of the configuration data found in multiple blocks. As such, access is initiated at step 180 by accessing the header block for the nonvolatile solid state memory. Control then passes to step 182 to find the link to the chain for the blocks related to entity type "C" in the header block. Control then passes to step 184 to step down through the chain, by first following the link to the chain in the header block to the first block in the chain. Control then passes to step 186 to determine whether the first block is a full block, and if so, control passes to step 188 to determine if the block is for the logical entity "D".

If so, control passes to step 190 to add an identifier for the block to a list of found blocks. Control then returns to step 184 to proceed down the chain to the next block. Moreover, if the block is determined to not be for logical entity "D" in step 188, step 190 is bypassed, and control returns directly to step 184 to process the next block in the chain.

Returning to step 186, if it is determined that the first block is a shared block, control passes to step 192 to step through the data sections or sub-blocks in the shared block to identify any that are for the logical entity "D". In particular, step 192 steps to the next data section or sub-block in the current block, and passes control to step 194 to determine if that section is for logical entity "D".

If so, control passes to step 196 to add an identifier for the block to the list of found blocks. Control then returns to step 192 to get the next data section in the block. If any additional data sections exist, control is again passed to step 194. Otherwise, once all data sections in the block have been processed, step 192 passes control to step 184 to proceed down the chain to the next block. The search terminates when step 184 determines no unprocessed blocks remain in the chain, whereby control is passed to step 198. At this point, the list of found blocks includes identifiers to every block and data section therein within which relevant configuration data may be found.

As noted above, in some embodiments it may be desirable to maintain a mirrored copy of the configuration data in the nonvolatile solid state memory in a volatile memory, as such, in these embodiments, the access of data as described above in connection with FIGS. 6 and 7 may involve the access of data from a mirrored copy in volatile memory, in lieu of accesses to the persistent copy of the configuration data in the nonvolatile memory.

Figure 8:
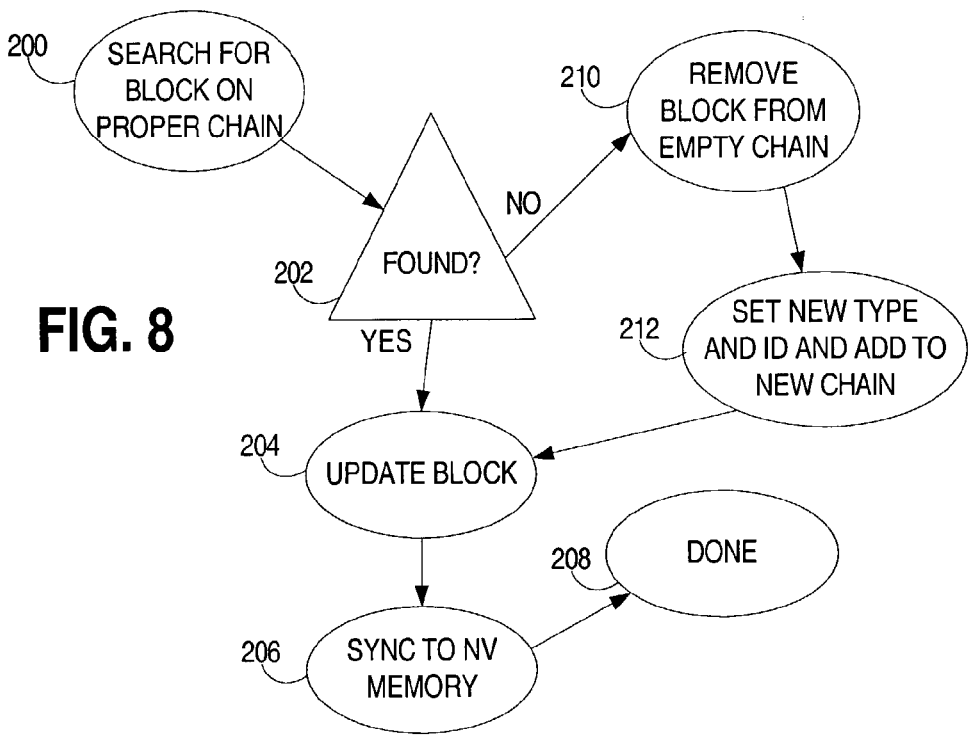
FIG. 8 is a flowchart illustrating exemplary steps utilized in changing data in a block from the nonvolatile solid state memory of FIG. 1.

It will be appreciated that configuration data will typically need to be modified as partitions are added or removed, and/or as hardware resources are added, removed, allocated or deallocated. FIG. 8, for example, illustrates exemplary steps utilized in changing or updating data in a block from nonvolatile solid state memory 13 (e.g., to modify data, add data and/or delete particular data). In particular, changing configuration data may initially include a search for the relevant block within which the data is stored, as shown in step 200. The search for the appropriate block may incorporate, for example, the steps discussed above in connection with FIG. 6. Next, step 202 determines whether the desired block was found. If so, the data in the block is updated in step 204.

In the illustrated embodiment, the data that is updated is mirrored data stored in volatile memory As such, it is desirable for control to pass to step 206 to synchronize the mirrored and persistent copies of the configuration data by synchronizing the nonvolatile solid state and volatile memories. Once the synchronization is complete, control passes to step 208 to complete the update operation.

Returning to step 202, if the appropriate block is not found, control passes to step 210 to remove a block from the chain of empty blocks, and then to step 212 to set the type and identification fields for the block to effectively add the new block to the appropriate chain. Control then passes to steps 204 and 206 to update the data in the block as appropriate and synchronize the volatile and nonvolatile solid state memories.

Synchronization of the volatile and nonvolatile memories may be implemented using any of a number of known techniques. For example, using one technique, whenever blocks are changed, those blocks may be added to a list of changed blocks such that, during synchronization, the list is accessed to write out all changed blocks to the nonvolatile solid state memory, with any checksum thereafter updated based upon the modified data.

Figure 9:
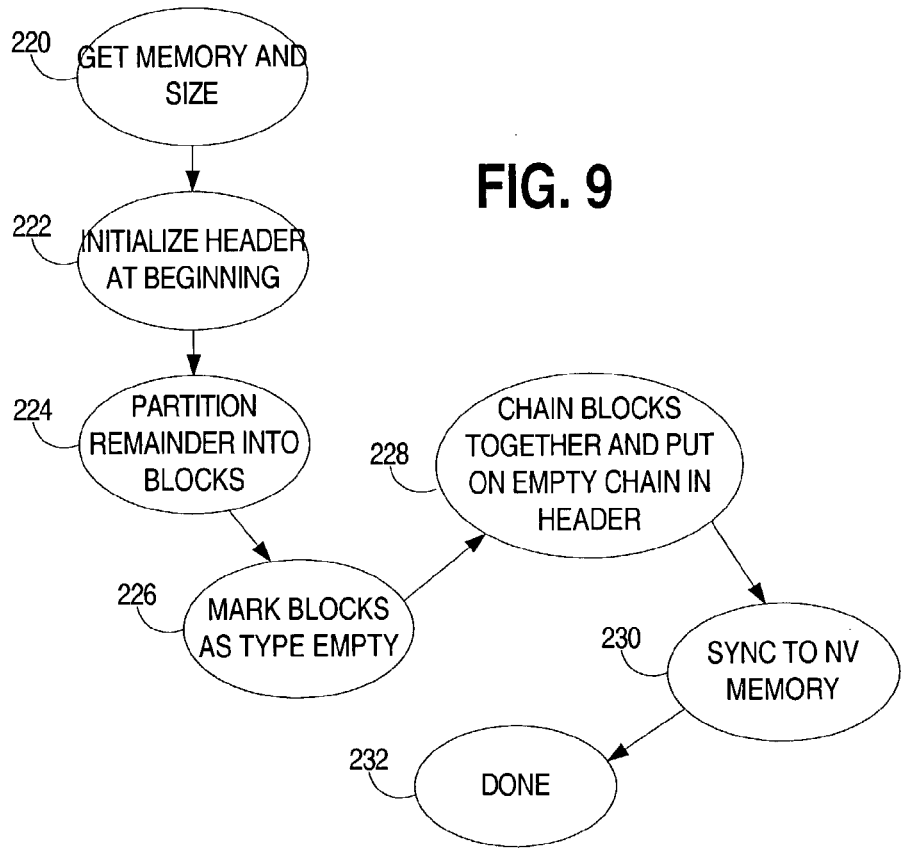
FIG. 9 is a flowchart illustrating exemplary steps utilized in initializing a volatile memory with configuration data stored in the nonvolatile solid state memory of FIG. 1.

Another function that may be supported in the illustrated embodiment, particularly when mirrored data is used, is that of initializing a volatile memory with the configuration data stored in the nonvolatile solid state memory. As shown in FIG. 9, for example, such a function may be initiated in step 220 to obtain the memory and size for the nonvolatile solid state memory, to permit a duplicate memory space to be allocated in volatile memory. Next, in step 222, a header is initialized at the beginning of the allocated memory space in the volatile memory. In step 224, the remainder of the memory space is partitioned into fixed size blocks, and in step 226, all blocks are initially marked as being empty blocks. Next, in step 228, the blocks are chained together using appropriate links, with the first block in the chain referenced by the link in the header for the empty block chain. In step 230, a synchronization operation is performed to synchronize the configuration data in the volatile memory with that in the nonvolatile solid state memory, thus permitting the initialization of the mirrored data in the volatile memory to be completed, as shown in step 232.

Various modifications may be made to the illustrated embodiments without departing from the spirit and scope of the invention. The invention therefore lies in the claims hereinafter appended.

What is claimed is:

1. An apparatus, comprising:
   a nonvolatile solid state memory configured to store configuration data for a plurality of logical entities in a logically-partitioned computer, the plurality of logical entities including first and second logical entities having the same entity type among a plurality of entity types, the memory organized into a plurality of fixed size blocks, wherein the plurality of fixed size blocks includes at least one full block and at least one shared block linked to one another in a chain, the full block including configuration data for the first logical entity, and the shared block including configuration data for each of the first and second logical entities; and
   program code configured to access the configuration data for the first logical entity by accessing the nonvolatile solid state memory to retrieve configuration data stored in each of the full and shared blocks in the chain.

2. The apparatus of claim 1, wherein the plurality of entity types includes entity types selected from the group consisting of logical partitions, networks, hardware devices, input/output adapters, virtual networks, virtual devices, and virtual input/output adapters.

3. The apparatus of claim 1, wherein the full block includes a link to the shared block, and wherein the program code is configured to retrieve configuration data stored in the shared block by accessing the link to the shared block in the full block.

4. The apparatus of claim 1, wherein the program code is further configured to mirror the configuration data in volatile memory.

5. The apparatus of claim 4, wherein the program code is further configured to synchronize the volatile and nonvolatile solid state memories in response to an update to the configuration data.

6. The apparatus of claim 1, wherein the program code is resident in a partition manager configured to manage a plurality of logical partitions using the configuration data.

7. The apparatus of claim 1, further comprising a service processor within which the nonvolatile solid state memory is resident.

8. The apparatus of claim 1, wherein the plurality of fixed size blocks further includes a header block.

9. The apparatus of claim 8, wherein the header block includes a plurality of links, each link pointing to a chain of fixed size blocks associated with the same entity type.

10. The apparatus of claim 9, wherein the header block includes a plurality of length indicators, each length indicator associated with a link among the plurality of links, and each length indicator indicating a number of blocks in a chain to which the associated link points.

11. The apparatus of claim 1, wherein each of the full and shared blocks includes a header, the header in each of the full and shared blocks identifying the chain with which the full and shared blocks are associated, and the header in the full block including a link to the shared block.

12. The apparatus of claim 11, wherein the header in the full block further includes a unique identifier for the full block, and wherein the shared block includes a plurality of sub-blocks, each sub-block including a unique identifier, wherein at least one of the plurality of sub-blocks includes configuration data for the first logical entity, and wherein at least one of the plurality of sub-blocks includes configuration data for the second logical entity.

13. The apparatus of claim 11, wherein the header in each of the full and shared blocks further identifies a format for the configuration data stored in the respective block.

14. A method of accessing configuration data for a logically-partitioned computer, the method comprising:
storing configuration data for a plurality of logical entities in a logically-partitioned computer in a nonvolatile solid state memory, the plurality of logical entities including first and second logical entities having the same entity type among a plurality of entity types, the memory organized into a plurality of fixed size blocks, wherein the plurality of fixed size blocks includes at least one full block and at least one shared block linked to one another in a chain, the full block including configuration data for the first logical entity, and the shared block including configuration data for each of the first and second logical entities; and
accessing the configuration data for the first logical entity by accessing the nonvolatile solid state memory to retrieve configuration data stored in each of the full and shared blocks in the chain.

15. The method of claim 14, wherein the plurality of entity types includes entity types selected from the group consisting of logical partitions, networks, hardware devices, input/output adapters, virtual networks, virtual devices, and virtual input/output adapters.

16. The method of claim 14, wherein the full block includes a link to the shared block, and retrieving configuration data stored in the shared block includes accessing the link to the shared block in the full block.

17. The method of claim 14, further comprising mirroring the configuration data in volatile memory.

18. The method of claim 17, further comprising synchronizing the volatile and nonvolatile solid state memories in response to an update to the configuration data.

19. The method of claim 14, wherein accessing the configuration data is performed by a partition manager configured to manage a plurality of logical partitions using the configuration data.

20. The method of claim 14, wherein the nonvolatile solid state memory is resident in a service processor in the logically-partitioned computer.

21. The method of claim 14, wherein the plurality of fixed size blocks further includes a header block.

22. The method of claim 21, wherein the header block includes a plurality of links, each link pointing to a chain of fixed size blocks associated with the same entity type.

23. The method of claim 22, wherein the header block includes a plurality of length indicators, each length indicator associated with a link among the plurality of links, and each length indicator indicating a number of blocks in a chain to which the associated link points.

24. The method of claim 14, wherein each of the full and shared blocks includes a header, the header in each of the full and shared blocks identifying the chain with which the full and shared blocks are associated, and the header in the full block including a link to the shared block.

25. The method of claim 24, wherein the header in the full block further includes a unique identifier for the full block, and wherein the shared block includes a plurality of sub-blocks, each sub-block including a unique identifier, wherein at least one of the plurality of sub-blocks includes configuration data for the first logical entity, and wherein at least one of the plurality of sub-blocks includes configuration data for the second logical entity.

26. The method of claim 24, wherein the header in each of the full and shared blocks further identifies a format for the configuration data stored in the respective block.

27. A program product, comprising:
program code configured to access configuration data stored in a nonvolatile solid state memory for a plurality of logical entities in a logically-partitioned computer, the plurality of logical entities including first and second logical entities having the same entity type among a plurality of entity types, the memory organized into a plurality of fixed size blocks, wherein the plurality of fixed size blocks includes at least one full block and at least one shared block linked to one another in a chain, the full block including configuration data for the first logical entity, and the shared block including configuration data for each of the first and second logical entities, and wherein the program code is configured to access the configuration data for the first logical entity by accessing the nonvolatile solid state memory to retrieve configuration data stored in each of the full and shared blocks in the chain; and
a computer recordable medium bearing the program code.

* * * * *